(12) United States Patent
Khazanov et al.

(10) Patent No.: US 10,300,361 B2
(45) Date of Patent: May 28, 2019

(54) BALL GAME TRAINING

(71) Applicant: PLAYSIGHT INTERACTIVE LTD., Kfar Saba (IL)

(72) Inventors: Evgeni Khazanov, Petah Tiqva (IL); Chen Shachar, Kohav Yair (IL); Yoram Ben Zur, Tzur Yigal (IL)

(73) Assignee: PLAYSIGHT INTERACTIVE LTD., Kfar Saba (IL)

( * ) Notice: Subject to any disclaimer, the term of this patent is extended or adjusted under 35 U.S.C. 154(b) by 0 days.

(21) Appl. No.: 15/543,225

(22) PCT Filed: Jan. 23, 2015

(86) PCT No.: PCT/IB2015/050515
§ 371 (c)(1),
(2) Date: Jul. 12, 2017

(87) PCT Pub. No.: WO2016/116780
PCT Pub. Date: Jul. 28, 2016

(65) Prior Publication Data
US 2017/0368439 A1    Dec. 28, 2017

(51) Int. Cl.
*A63B 24/00* (2006.01)
*A63B 69/38* (2006.01)
(Continued)

(52) U.S. Cl.
CPC .......... *A63B 69/38* (2013.01); *A63B 24/0006* (2013.01); *A63B 24/0021* (2013.01);
(Continued)

(58) Field of Classification Search
CPC ..... A63B 24/0021; A63B 69/40; A63B 69/38; A63B 2024/0025; A63B 2024/0028;
(Continued)

(56) References Cited

U.S. PATENT DOCUMENTS

2001/0056000 A1* 12/2001 Hori ................ A63B 63/00
473/453
2002/0148455 A1* 10/2002 Trajkovic ............... A63B 24/00
124/34
(Continued)

OTHER PUBLICATIONS

International Search Report dated Jun. 29, 2015 in PCT/IB2015/050515 (2 pages).
(Continued)

*Primary Examiner* — David Duffy
*Assistant Examiner* — Ankit B Doshi
(74) *Attorney, Agent, or Firm* — Acuity Law Group, P.C.; Michael A. Whittaker

(57) ABSTRACT

A method for ball game training, the method comprising steps executed by at least one computer, the steps comprising: receiving image data of a player and a ball, the image data being captured using at least two cameras, using the received image data, tracking motion of the player and motion of the ball in three dimensions, based on the tracked motions, predicting a position of the player and a trajectory of the ball, and based on the predicted position and trajectory, generating a control command for at least one ball throwing machine.

23 Claims, 5 Drawing Sheets

(51) Int. Cl.
*A63B 69/40* (2006.01)
*A63B 71/06* (2006.01)
*G06T 7/246* (2017.01)
*G06T 7/277* (2017.01)

(52) U.S. Cl.
CPC ...... *A63B 24/0062* (2013.01); *A63B 24/0075* (2013.01); *A63B 24/0087* (2013.01); *A63B 69/40* (2013.01); *A63B 71/0622* (2013.01); *G06T 7/251* (2017.01); *G06T 7/277* (2017.01); A63B 2024/0009 (2013.01); A63B 2024/0012 (2013.01); A63B 2024/0025 (2013.01); A63B 2024/0028 (2013.01); A63B 2024/0096 (2013.01); A63B 2071/0666 (2013.01); A63B 2071/0694 (2013.01); A63B 2207/02 (2013.01); A63B 2220/806 (2013.01); A63B 2220/808 (2013.01); A63B 2225/20 (2013.01); A63B 2225/50 (2013.01); G06T 2207/10021 (2013.01); G06T 2207/30196 (2013.01); G06T 2207/30224 (2013.01); G06T 2207/30241 (2013.01)

(58) Field of Classification Search
CPC .... A63B 2024/0034; A63B 2069/0008; A63B 2102/18; A63B 2102/182; A63B 2102/20; A63B 69/0002; G06T 2207/30224; G06T 2207/30241
See application file for complete search history.

(56) References Cited

U.S. PATENT DOCUMENTS

| | | | |
|---|---|---|---|
| 2005/0032581 A1* | 2/2005 | Wagner | A63B 24/0021 473/173 |
| 2006/0018516 A1 | 1/2006 | Masoud et al. | |
| 2012/0029666 A1* | 2/2012 | Crowley | A63B 24/0062 700/91 |
| 2013/0018493 A1 | 1/2013 | Amini | |
| 2013/0104869 A1* | 5/2013 | Lewis | A63B 69/40 124/78 |
| 2013/0104870 A1 | 5/2013 | Rizzo et al. | |
| 2014/0180451 A1* | 6/2014 | Marty | G09B 19/0038 700/91 |

OTHER PUBLICATIONS

Written Opinion dated Jun. 29, 2015 in PCT/IB2015/050515 (6 pages).

Roy et al., "Design and Development of Indigenous Cricket Bowling Machine", Journal of Scientific & Industrial Research, 65:148-152, 2006.

* cited by examiner

BALL GAME TRAINING

CROSS-REFERENCE TO RELATED APPLICATIONS

The present invention is filed under 35 U.S.C. § 371 as the United States national phase of International Application No. PCT/IB2015/050515, filed Jan. 23, 2015, which designated the United States and which is hereby incorporated in its entirety including all tables, figures, and claims.

FIELD AND BACKGROUND OF THE INVENTION

The present invention relates to sport training, and more particularly but not exclusively, to ball game training, using ball throwing machines.

Today, many professional and amateur athletes use ball throwing machines to practice their particular sport.

For example, tennis ball throwing machines (also referred to as ball machines, ball projecting machines, etc.) are extremely useful practice tools for tennis players.

Typically, these machines are loaded with tennis balls and placed at an end of a tennis court which is opposite the practicing player.

Usually, the desired trajectory of the ball is set, either manually by the player or with the aid of a remote control. Balls are then lobbed or shot out of the machine towards the player, to allow practice shots to be hit. Such machines usually project tennis balls or other types of balls, by utilizing pneumatic power, rotating wheels, and/or spring power, to grasp the balls and project them outwardly.

As ball throwing machines have been utilized for many years by now, there have been many improvements in throwing machine technology.

For example, higher end tennis ball throwing machines have been provided with more ways to control the trajectory of the projected tennis balls, say in order to provide for left and right ball throwing variations, as well as for up and down ball throwing variations.

Some of those higher end tennis ball throwing machines have been provided with some level of pre-programming and storing of the kind of shots and the sequence of shots that a tennis player wishes to practice returning.

Having been programmed that way, a ball throwing machine serves the ball shots in the pre-programmed sequence of ball shots, progressing from one ball shot to the other.

The ball throwing machine progresses from one ball shot to the other, each time the tennis player pushes a button, or rather automatically, say with time intervals that may optionally, be preset by the tennis player or his coach.

For example, some of the ball machines currently in use allow the user (say the tennis player or the player's coach), to adjust the timing of a firing sequence. Thus, for example, if the tennis ball machine is set on a fast speed, shots may be fired every two seconds. Similarly, if the ball machine is set on a slow speed, a longer period of time will lapse between shots.

SUMMARY OF THE INVENTION

According to a first aspect of the present invention there is provided a method for ball game training, the method comprising steps executed by at least one computer, the steps comprising: receiving image data of a player and a ball, the image data being captured using at least two cameras, using the received image data, tracking motion of the player and motion of the ball in three dimensions, based on the tracked motions, predicting a position of the player and a trajectory of the ball, and based on the predicted position and trajectory, generating a control command for at least one ball throwing machine.

According to a second aspect of the present invention there is provided a system for ball game training, the system comprising: a computer, an image data receiver, implemented on the computer, configured to receive image data of a player and a ball, the image data being captured using at least two cameras, a three dimensional motion tracker, in communication with the image data receive, configured to track motion of the player and motion of the ball in three dimensions, using the received image data, a position predictor, in communication with the three dimensional motion tracker, configured to predict a position of the player and a trajectory of the ball based on the tracked motions, and a control command generator, in communication with the position predictor, configured to generate a control command for at least one ball throwing machine based on the predicted position and trajectory.

According to a third aspect of the present invention there is provided a non-transitory computer readable medium storing computer executable instructions for performing steps of ball game training, the steps comprising: receiving image data of a player and a ball, the image data being captured using at least two cameras, using the received image data, tracking motion of the player and motion of the ball in three dimensions, based on the tracked motions, predicting a position of the player and a trajectory of the ball, and based on the predicted position and trajectory, generating a control command for at least one ball throwing machine.

Unless otherwise defined, all technical and scientific terms used herein have the same meaning as commonly understood by one of ordinary skill in the art to which this invention belongs.

The materials, methods, and examples provided herein are illustrative only and not intended to be limiting.

Implementation of the method and system of the present invention involves performing or completing certain selected tasks or steps manually, automatically, or a combination thereof.

Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. The description taken with the drawings making apparent to those skilled in the art how the several forms of the invention may be embodied in practice.

In the drawings.

DESCRIPTION OF THE PREFERRED EMBODIMENTS

Figure 1:
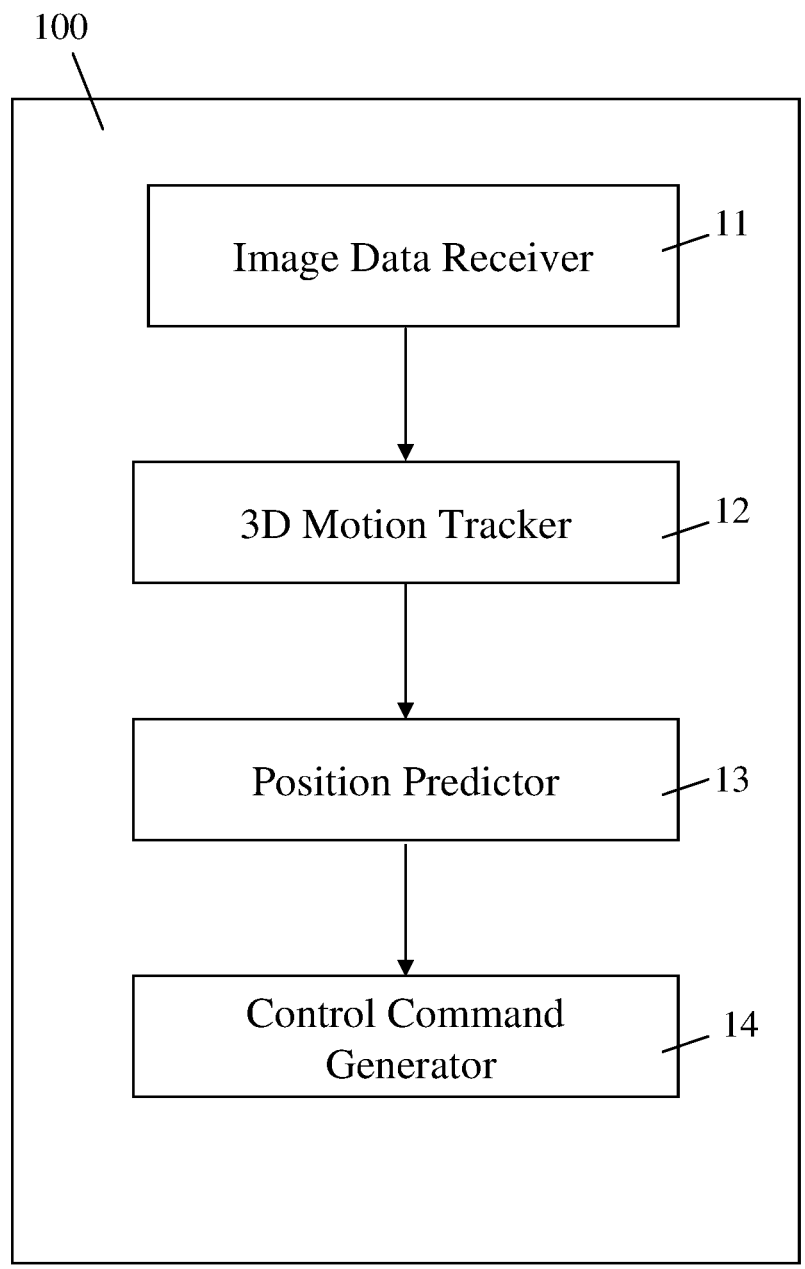
FIG. 1 is a block diagram schematically illustrating a first exemplary system for ball game training, according to an exemplary embodiment of the present invention.

The present embodiments comprise a system and method for ball game training, say for tennis training of a professional or an amateur tennis player, using one or more ball throwing machines, cameras, and a computer.

For example, by now, tennis ball throwing machines have become extremely useful practice tools widely used by professional and amateur tennis players.

Embodiments of the present invention are based on tracking both the motion of a player and the motion of a ball, during a training session, using a computer, and based on that tracking, controlling ball throwing machines, by the computer, for throwing balls in a way and time dependent on the tracked motions.

Thus, according to one exemplary embodiment, there is provided a system for ball game training, say for tennis training, which system comprises two or more video cameras, one or more ball throwing machines, and a computer.

In the exemplary embodiment, during a training session, the computer receives image data of a player and a ball, in real time (or near real time), as captured live by the cameras, during the session, as described in further detail hereinbelow.

Using the received image data, the computer tracks motion of the player and motion of the ball in three dimensions, and based on the tracked motions, the computer predicts a position of the player and a trajectory of the ball. For example, the computer may predict the position of the player a few second after the player hits the ball, and the trajectory of the ball having been hit by the player (say a specific tennis ball's trajectory towards the end of a tennis court, opposite the player).

Based on the predicted position and trajectory, the computer generates a control command for at least one of the ball throwing machines, as described in further detail hereinbelow.

Thus, for example, in a tennis training scenario, a tennis player runs towards a ball thrown by one of the ball throwing machines, and hits the ball with a racket.

Video images of the tennis player's running and hitting are captured by the cameras and fed as image data to the computer, which in turn, tracks both the motion of the player and the motion of the ball—before, during, and after the player's hitting of the ball.

In the example, based on, say the velocity and direction of the ball and of the player, tennis rules, and historic data gathered on the player, the computer predicts the ball's trajectory towards a point at the tennis court's half opposite the player, and the player's position when the ball is supposed to hit the point.

Then, based on the predicted player's position and ball's trajectory, the computer generates a control command for one of the ball throwing machines, to throw a ball towards the player's half of the court.

The control command instructs the ball throwing machine, to throw the ball in a way (say with a velocity, direction, and spin) and time, which depend on the predicted position and trajectory.

In one example, the player (or another user) is allowed to select a virtual opponent (say a famous tennis player). Consequently, the control command instructs the machine to throw the ball in a way in which a famous player (say Novak Djokovic) is likely to hit back a ball having the predicted trajectory, when the famous player's opponent runs to the predicted position, in light of historic data gathered on the famous player.

Optionally, the computer may further select the ball throwing machine among two or more ball throwing machines positioned on the court, based on the predicted player's position and ball's trajectory, and on the historic data gathered on the famous player, and send the control command to the selected machine.

Thus, potentially, with a system according to the exemplary embodiment, the ball throwing machines function in a way which may prove more realistic, in light of real time performance by the player.

The principles and operation of a system and a method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings.

The invention is capable of other embodiments or of being practiced or carried out in various ways. Also, it is to be understood that the phraseology and terminology employed herein is for the purpose of description and should not be regarded as limiting.

Reference is now made to FIG. 1, which is a block diagram schematically illustrating a first exemplary system for ball game training, according to an exemplary embodiment of the present invention.

A system 100 for ball game training, according to an exemplary embodiment of the present invention, includes a computer. The computer may include a single computer, a group of computers in communication over a network, one or more electric circuits, or any combination thereof.

The system 100 further includes one or more additional parts, such as the parts denoted 11-14 in FIG. 1. The additional parts may be implemented as software, as hardware, or as a combination of hardware and software, on the computer, as described in further detail hereinbelow.

The computer communicates with two or more video cameras, for receiving images, say for receiving live video images of a professional or an amateur tennis player and of a tennis ball, as the player plays on a tennis court, against one or more ball throwing machines. Indeed, by now, ball throwing machines have been utilized in tennis and other fields of sport for many years.

The system 100 includes a video image receiver 11.

The video image receiver 11 receives image data of the player and ball, as captured by the cameras, in real time or in near real time—say video streams captured live by each one of the cameras during a training session, and fed to the video image receiver 11 in real time or in near real time, as described in further detail hereinbelow.

Optionally, the video image receiver 11 further records the received image data, say the video streams, in a database.

The system 100 further includes a three dimensional (3D) motion tracker 12, in communication with the video image receiver 11.

The three dimensional (3D) motion tracker 12 tracks motion of the player and motion of the ball in three dimensions, using the image data received by the video image receiver 11, as described in further detail hereinbelow.

Optionally, the 3D motion tracker 12 further tracks the motion of the one or more ball throwing machines, using the image data received by the video image receiver 11, say in the same way which the 3D motion tracker 12 uses for tracking the motions of the player and ball, or in another way, as described in further detail hereinbelow.

Optionally, for tracking the motion of the player and the motion of the ball in three dimensions, the 3D motion tracker 12 generates a three dimensional (3D) space model of a constrained environment in which the training of the player takes place. Thus, for example, the 3D space model may map the constrained environment of a tennis court in use by the player, in three geographic coordinates, as known in the art.

In one example, the 3D motion tracker 12 generates the 3D space model through stereoscopic analysis of video streams received simultaneously by the video image receiver 11 from the two or more cameras, or through any other, known in the art 3D modeling technique.

In the example, the two (or more) cameras continuously capture images of the constrained environment (i.e. of the court, player, ball, and surroundings) in image data—say as video streams, and feed the image data to the video image receiver 11

Based on the continuous feed of the video streams, the 3D motion tracker 12 updates the 3D space model, and uses the thus dynamically updated 3D space model, to track the motions of the player and ball.

Thus, in one example, the 3D motion tracker 12 tracks a round or oval image of the ball and a round or oval image of player' head in the 3D space model based on the image data received simultaneously by the video image receiver 11 from the two or more cameras. The 3D motion tracker 12 keeps track of each round or oval image's location, during a session of training the player. Typically, the round or oval image of the ball differs from the round or oval image of the player, in size or shape.

For example, the three dimensional (3D) motion tracker 12 may track the motions, using images of the tennis player when the player runs on a tennis court towards a ball thrown by one of the ball throwing machines, and hits the ball with a tennis racket—as captured in the image data received by the video image receiver 11.

In the example, when the player runs to hit the ball thrown by the ball throwing machine, the tracked motions include the motion of the player before, during, and after the player's hitting of the ball, as well as the ball's motion before and after being hit, as described in further detail hereinbelow.

The system 100 further includes a position predictor 13, in communication with the 3D motion tracker 12.

The position predictor 13 predicts a position of the player and a trajectory of the ball based on the motions tracked by the 3D motion tracker 12, as described in further detail hereinbelow.

Optionally, the position predictor 13 predicts the position of the player and the trajectory of the ball, based on one or more parameters. The parameters may include, but are not limited to: velocity and direction of the ball and of the player, spin of the ball, sport (say tennis) rules, automatic identification of certain events based on sport rules, wind conditions, historic data gathered for the player, etc., or any combination thereof, as described in further detail hereinbelow.

In one example, based on the tracked motions of the player and ball, the position predictor 13 predicts a tennis player's position two seconds after the player hits the ball, and the ball's trajectory over a tennis court's half opposite the player (i.e. the half which would be used by a real opponent), after being hit by the tennis player.

The position predictor 13 may also take historic data gathered on the tennis player, into consideration, for predicting the player's position, say statistical data gathered during the player's previous training sessions. The statistical data may indicate, for example, the player's preferences over different areas of the tennis court—say a preference for areas near one of court's corners.

The system 100 further includes a control command generator 14, in communication with the position predictor 13.

The control command generator 14 generates a control command for one or more ball throwing machine, based on the predicted player's position and ball's trajectory.

The control command instructs the ball throwing machine, to throw the ball in a way (say with initial velocity, direction, and spin), time, etc., which depend on the position and trajectory predicted by the position predictor 13.

In a first example, the control command generator 14 calculates the way for throwing the ball such that the thrown ball's trajectory expected when the ball is thrown that way, extends from the ball throwing machine into an area near the net, just opposite the predicted position of the player. Then, the control command generator 14 specifies the selected way (say the initial velocity and direction to be given to the ball when being thrown) in the control command.

Optionally, for calculating the way for throwing the ball, the control command generator 14 further takes the ball throwing machine's position into consideration, say using location data received from the 3D motion tracker 12 based on the tracking of the ball throwing machine's motion, as described in further detail hereinabove.

Optionally, the player (or another user—say the player's coach) is allowed to select a virtual opponent (say a famous tennis player or simply, another player previously trained using the system 100).

Consequently, the generated control command instructs the ball throwing machine to throw the ball in a way in which the selected opponent (say the famous player) is likely to hit a ball having the predicted trajectory, when the famous player's opponent runs to the predicted position, in light of historic data gathered on the opponent.

Thus, in one example, the control command generator 14 selects the ball's velocity, direction, and/or spin based on past performance by the famous player when hitting a ball with a parabolic trajectory similar to the ball's predicted trajectory, say a trajectory which extends into a distance of less than one meter from the net.

For example, when Bjorn Borg is selected as a virtual opponent, the control command generator 14 may select a spin which when being applied to the thrown ball, the ball flies in a way which resembles the way Bjorn Borg would hit back a ball served with a trajectory similar to the predicted trajectory, say with Topspin.

Indeed, Topspin is typical of Bjorn Borg's play when hitting back a ball near the net. Topspin is a ball's spin with which the ball rotates forwards as it moves. Topspin on a ball propelled through the air imparts a downward force that causes the ball to drop, due to the ball's interaction with the air.

Optionally, the control command generator 14 further generates the control command based on one or more drill patterns predefined by a user (say the player's coach), operator, programmer or administrator of the system 100, as described in further detail hereinbelow.

For example, the user may be allowed to customize the system 100, using a GUI (Graphical User Interface) made of one or more menu pages, and thereby define to the system 100 a drill pattern with which a tennis player's net game is improved, by forcing the player to hit the ball from areas close to the net.

Consequently, when a user chooses the predefined drill pattern, say using one of the menu pages, the control command generator 14 generates control commands which instruct the ball throwing machine to throw the ball in a way which sends the ball into a trajectory which ends close to the net. Optionally, for generating the control commands, the control command generator 14 takes into consideration the player's predicted position, such that the trajectory of ball ends close to the net, at a distance from the predicted position, which distance grows from one command to the next.

Optionally, after the user (say coach) chooses the predefined drill pattern (or rather after the drill pattern is preselected automatically, say by the control command generator 14), the control command generator 14 keeps generating each control command based on the same, selected drill pattern. The control command generator 14 keeps issuing control commands based on the same selected drill pattern, until a goal predefined by a user is achieved by the player. The goal may be predefined by a user (say the player's coach), operator, programmer or administrator of the system 100, as described in further detail hereinbelow.

In one example, the control command generator 14 verifies that the player has managed to achieve the predefined goal, say to hit the ball near the net for twenty times in a row, using motion tracking data generated by the 3D motion tracker 12.

In the example, each time the player hits the ball within a distance of less then one meter away from the net, the motion tracking data indicates that the ball thrown is successfully hit by the player, and counts the hit as one of those twenty times, as described in further detail hereinbelow. Optionally, the system 100 further includes a speaker, and the control command generator 14 notifies the player that the ball is successfully hit by the player, and that therefore, the hit counts towards achieving the goal of those twenty times.

Optionally, the system 100 further includes a scoring manager, in communication with the 3D motion tracker 12.

The scoring manager uses rule games (say tennis rules) input by the system's 100 administrator, operator, user, programmer, etc. (say using a GUI interface implemented by the computer), and tracking data generated by the 3D motion tracker 12, for detecting event predefined in the input rules (say a Tennis Out Event). Based on the detected event, the scoring manager updates a score of the player or of the virtual opponent, say according to the tennis rules, as known in the art.

Optionally, the control command generator 14, position predictor 13, or both, further use pattern analysis and what-if simulation, for the tracking, or for the predicting, as described in further detail hereinbelow.

Optionally, the system 100 further includes one ball throwing machine. Alternatively, the system 100 further includes two or more ball throwing machines, as described in further detail hereinbelow.

Optionally, the system 100 further includes a ball throwing machine selector (not shown), in communication with the control command generator 14, position predictor 13, or both.

The ball throwing machine selector selects one ball throwing machine among two (or more) ball throwing machines deployed at different positions (say at different positions on the tennis court on which the player is trained), as a destination for the generated control command.

Consequently, the control command generator 14 sends the control command to the machine selected by the ball throwing machine selector.

Optionally, the ball throwing machine selector selects the ball throwing machine among the two or more ball throwing machines, based on the player's position and ball's trajectory, as predicted by the position predictor 13.

Optionally, the ball throwing machine selector selects the ball throwing machine based on the predicted position of the player and trajectory of the ball as well as on the positions of the ball throwing machines.

Optionally, the ball throwing machine selector further uses location data generated by the 3D motion tracker 12, as the 3D motion tracker 12 tracks the motions of one or more of the ball throwing machines, for selecting the machine, as described in further detail hereinbelow.

Optionally, the ball throwing machine selector additionally or alternatively, uses historic data previously gathered on the selected virtual opponent (say the famous player), for selecting the ball throwing machine.

In one example, the ball throwing machine selector further uses historic statistical data previously input to the system 100 (say into a dedicated computer database implemented on the computer), say by an administrator of the system 100.

In the example, the historic statistical data indicates that the famous player has a preference for tennis net play, or rather that the famous player has a tendency to hit back a ball from specific areas of the court, as described in further detail hereinbelow.

Optionally, the ball throwing machine is movable around the court, say on a rail (say a rail which runs along the court's side opposite the player) on which the machine is movably mounted, or simply on wheels, using an engine of the machine. The control command generator 14 may further generate a control command for the machine to move over, to a destined position selected by the control command generator 14 based on the predicted position and trajectory, as described in further detail hereinbelow.

Optionally, the ball throwing machine further has a mechanical arm, movable by an engine installed on the machine, for hitting a ball (say a mechanical arm shaped like or connected to a tennis racket). The control command generator 14 may further generate a control command for the machine to hit the ball having the predicted trajectory, with the mechanical arm, as described in further detail hereinbelow.

Optionally, the system 100 further comprises a calibrator (not shown), say a calibrator in communication with the 3D motion tracker 12, the video image receiver 11, or both.

The calibrator identifies location of a predefined object present in an area used for the training (say of one or more white border lines of a tennis court), in the received image data.

Optionally, for carrying out the calibration, the calibrator divides the court as captured by the cameras in the image data, into a grid representative of the court's layout, and checks each junction in the grid for a deviation from the grid.

For example, the calibrator may use tennis court's boundary parts, as identified in the image data, for estimating all boundary lines of the court, divide the court, as captured in the image data, with a grid representative of the boundary lines of the whole court, and detect areas that are clearly out of those boundaries.

Optionally, based on detected deviation from the grid, the calibrator automatically issues control commands to a controller (say a dedicated computer) connected to the cameras, to re-align the cameras' direction, tilt angle, etc., as described in further detail hereinbelow. Preferably, the deviation from the grid is detected in real (or near real) time, and the calibrator issues the control commands promptly after the detection, thus improving the quality of the image data received by the image data receiver 11 from the cameras, during the training session.

Optionally, based on the detected deviation, the calibrator instructs the 3D motion tracker 12 to update the three dimensional (3D) space model of the constrained environment (say of the court). Consequently, the 3D motion tracker 12 removes parts which are outside the court and are not relevant for tracking the motions of the player and ball, from the 3D space model, or changes an orientation of the 3D space model, as described in further detail hereinbelow.

Thus, based on the identified location of the predefined object (say a borderline of the tennis court) in the image data, the calibrator may improve the tracking of the motions, the capturing of the image data by the cameras, or both the tracking and the capturing.

Optionally, the system 100 further includes a pointer (not shown), in communication with the control command generator 14.

Optionally, the pointer points a position to the player, using one or more light sources, as described in further detail hereinbelow.

Optionally, the pointer rather points the position to the player, using a computing device wearable by the player. The computing device may be in wireless communication with the computer. For example, the pointer may use a wireless data link based on Bluetooth® technology, to point the position to the player, by presenting the image on a display of an eyewear or a smart helmet of the sort used for virtual reality and augmented reality applications, as known in the art.

Optionally, the pointer points a point for the player to hit, and based on the tacking of the motion of the ball by the 3D motion tracker 13, the command control generator 14 notifies the player on the results of the player's attempt to hit the point with the ball, say using one or more speakers, as described in further detail hereinbelow.

Optionally, the pointer points a simulated position of a virtual opponent to the player—say of the famous player selected as a virtual opponent, as described in further detail hereinbelow.

In one example, the system 100 includes one or more light sources. Each of the light sources is installed on a respective position of the court and is connected to the computer on which the pointer is implemented, and the pointer controls the light source directly from the computer, as described in further detail hereinabove.

In another example, each light source is installed on a respective one of the ball throwing machines, and the pointer sends a control command to a selected one of the ball throwing machine, for pointing the simulated position, using the light source, as described in further detail hereinbelow.

Optionally, the pointer uses the light sources, to project an image of the virtual opponent—say a real (i.e. three dimensional) hologram of the famous player, or rather a two dimensional image of the famous player—to the player, as the player trains on the court, for pointing a simulated position of the virtual opponent to the player.

Optionally, the projection of the real hologram involves one of currently used techniques for projecting real (i.e. three dimensional) holograms or two dimensional images.

For example, the system 100 may include an array made of one or more laser beam sources (say helium-neon lasers), lenses, mirrors, prisms, beam splitters, etc., or any combination thereof, as known in the art. The array's elements may be installed at different positions of the constrained environment, on the ball throwing machines, etc., or any combination thereof.

Thus, in one example, when the player hits the ball with a trajectory predicted by the position predictor 13 to extend towards a point close to a specific one of several ball throwing machines deployed on the court, the pointer projects a hologram of the virtual opponent (say of Novak Djokovic) standing next to the specific ball throwing machine.

Similarly, in another example, the position predictor 13 predicts a certain position of the player when the player waits to be served a ball. Consequently, an image (say a hologram) of the virtual opponent (say the famous player) serving a ball is projected in front of a ball throwing machine instructed to throw a ball by the control command generator 14 generated control command. The virtual opponent's image is projected, say for a period of a few seconds before the ball throwing machine actually throws the ball.

Optionally, a user (say a coach) is allowed to remotely control the pointer, for pointing a simulated position of a virtual opponent to the player, say for projecting and moving an image of the virtual opponent around the court, thus allowing the user to manually intervene in a training session of the player using the system 100.

Thus, for example, by moving the image around the court, the user (say coach) may encourage the player to exercise certain play styles, say a net play, a variety of types of ball shots (i.e. different ways of hitting the ball), etc.

Optionally, the control command generator 14 generates the control commands based on the position pointed by the user (say the coach), say by moving the hologram to a specific position. For example, the control command generator 14 may generate a control command which instructs one of the ball throwing machines, to throw a ball in a direction, spin, and velocity, which are likely to send the ball into a trajectory which passes exactly over the position pointed by the user.

Optionally, the control command generator 14 further bases the generation of the control command on motion of another player preselected as an opponent to the player and of a ball used by the other player, as tracked in a location remote from the ball throwing machine, during the training.

In one example, a second system similar to the first system 100, which includes components similar to the components 11-14 of the first system, may be installed at a remote tennis court in use by the other tennis player.

In the example, the second system communicates tracking data generated by the second system's component similar to the 3D motion tracker 12 of the first system 100, from tracking the motion of the other player and ball in use by the other player, to the control command generator 14 of the first system, in real time or near real time.

Consequently, the control command generator 14 may further base the generation of the control command on the tracking data thus communicated by the second system in real time or near real time.

Optionally, the control command generator 14 further generates the control command based on motion of an avatar in a video game, or a video game based GUI, as used by a user of the video game or GUI, during a training of the player, as described in further detail hereinbelow.

In one example, the computer game is a part of a GUI of an application which allows a user to remotely control the system 100, thus providing for a remote control functionality based on gamification, as known in the art.

For example, the system 100 may further include a server (say a web server), on which a tennis computer game may be played by a user remote from the server, say using an internet web browser installed on the remote user's computer (say a tablet computer or a cellular phone).

The computer game of the example is implemented using a dedicated computer program, which program allows the user to control an avatar of a tennis player who plays against a second avatar, in the computer game. The motion of first avatar, controlled by the user during the game, is tracked by the computer program, and is communicated to the control command generator 14, in real time, say in a data file.

Consequently, the control command generator 14 further bases the generation of the control command on the tracking data communicated in the data file. Thus, in one example, the player's coach may use the computer game, to remotely intervene in the training session, and guide the player through the training session, say from the coach's home.

Optionally, the system 100 further includes a video game content generator, configured to generate video game content based on the tracking by the 3D motion tracker 12 and predicting by the position predictor 13, as described in further detail hereinbelow.

In a first example, the video game content generator is implemented by the position predictor 13 and the computer program which implements the computer game on the web server.

In the first example, the position predictor 13 communicates the predicted player's position and ball's trajectory to the program which implements the computer game on the server. The computer program in turn, moves the second avatar in a motion based at least partially, on the predicted player's position and ball's trajectory.

In a second example, the video game content generator is implemented by the 3D motion tracker 12, the computer program which implements the computer game, and a database on which the tracked motions of the player and ball are recorded during a training session.

In the second example, during the training session, the player's motion and ball's motion are tracked by the 3D motion tracker 12. The tracked motions and positions from which the ball is thrown at the player, per the control commands generated by the control command generator 14, are recorded in a database, say by the 3D motion tracker 12.

Consequently, in the second example, after the training session, the program which implements the computer game, generates game content which graphically presents the tracked motion, in the computer game, using the database, as described in further detail hereinbelow. Optionally, for representing the tracked motions of the player, ball, virtual opponent, or any combination thereof, through the generation of the game content, the program uses a three dimensional (3D) graphical engine, as known in the art.

Optionally, the system further includes one or more microphones and a voice recognition component implemented on the computer, say as a software component in communication with the control command generator 14. Consequently, the control commands generated by the control command generator 14, are further based on voice commands received from the player, and picked by the microphones, during a training session.

The voice commands may include commands such as: "Start session", "stop session", "start drill number seven", "Start drill pattern of beginners level", etc., or any combination thereof.

Optionally, the system 100 further includes a hit identifier (not shown), in communication with the 3D motion tracker 12.

Using tracking data pertaining to the ball, as generated by the 3D motion tracker 12, the hit identifier identifies if after being hit by the player, the ball hits a specific position, say a position pointed to the player by the player's coach, using a light source, as described in further detail hereinabove.

Optionally, the system 100 further includes two or more cameras. At least two of the cameras are used to capture images of the closed environment and generate the image data—say live video streams of the constrained environment of the court in which the player and ball move around, as described in further detail hereinabove.

Optionally, at least one of the cameras is a Pan-Tilt-Zoom (PTZ) camera, and the system 100 further includes a camera controller, in communication with the 3D motion tracker 12, the position predictor 13 or both the motion tracker 12 and the position predictor 13, as described in further detail hereinbelow.

The camera controller controls the one or more PTZ cameras based on the motions of the player and ball as tracked by the 3D motion tracker 12, on the player's position and ball's trajectory as predicted by the position predictor 13, or on both.

Optionally, the system 100 further includes an analyzer (not shown), in communication with the position predictor 13.

Upon operation by a user of the system 100, say the player's coach, and after one or more training sessions, the analyzer may carry out bio-mechanical analysis, technical analysis, tactical analysis, another form of analysis, or any combination thereof, on the motions of the player and ball, through known in art analysis techniques.

Optionally, the system 100 further includes a logger which logs the motions tracked during the training session, in a database, and a briefing module which is operable by a user of the system 100, say the player's coach, for presenting tracked motions of the player and ball on a screen of the computer. Consequently, the user is allowed to analyze the player's performance, explain mistakes, etc., as known in the art. Optionally, the briefing module further uses image data received and recorded (say in a database) by the image data receiver 11, as described in further detail hereinbelow.

Optionally, the briefing module combines data recorded in the system's 100 one more databases, for review, analysis, what-if scenarios (say that the player has a higher chance to hit the ball if the player improves his net play skills, change his serving positions), etc., as known the art.

In one example, the briefing module generates and presents on the computer's screen, a video clip. Optionally, the briefing module generates the video clip, by overlaying a part of the image data (say video streams) with animated images of the player, virtual opponent, or both, as known in the art. Alternatively, the video clip is rather based on the computer game content, as described in further detail hereinabove.

Figure 2:
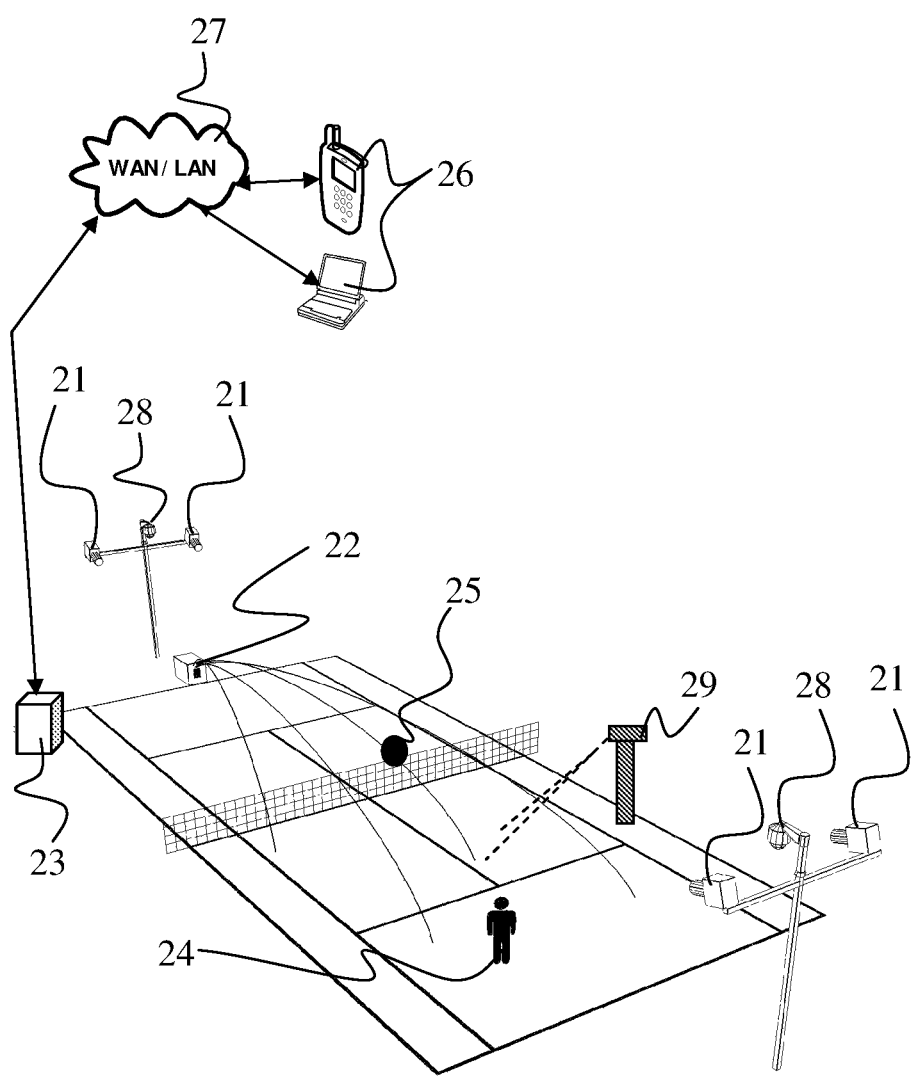
FIG. 2 is a block diagram schematically illustrating a second exemplary system for ball game training, according to an exemplary embodiment of the present invention.

Reference is now made to FIG. 2, which is a block diagram schematically illustrating a second exemplary system for ball game training, according to an exemplary embodiment of the present invention.

A second system, according to an exemplary embodiment of the present invention, includes two or more cameras 21 deployed at locations which enable to cover a three dimensional space of a constrained environment, such as a real professional tennis court, or another court in use for practicing tennis or another sport.

The system further includes one or more ball throwing machines 22 deployed at positions around the court, and a computer 23.

With the system, a player 24 (say a professional or amateur tennis player), may be trained, through a training session in which the ball machine 22 is controlled by the computer 23, for throwing balls 25 in a way similar to a real human opponent's way of serving or hitting back the balls. Consequently, the player may potentially, be given a more realistic training experience.

The computer 23 implements one or more the parts of system 100, for controlling the action, motion, etc., of the ball machine 22, as described in further detail hereinabove, and as illustrated using FIG. 1.

Optionally, the system further includes a remote computer 26, such as a mobile communication device (say a smart phone), a laptop computer, a tablet computer, etc., as know in the art.

The remote computer 26 communicates with the system's computer 23 over a wide area network (WAN) or a local area network (LAN) network 27, such as the Internet or any other data communications link or network, say for remote controlling of the system, say using an avatar in a computer game, etc., as described in further detail hereinabove.

Optionally, the system further includes one or more PTZ video cameras 28 for capturing and recording of the player's 24 and ball's 25 motions, say by allowing operations such as zooming in on the human player's 24 motion, say for enabling biomechanical analysis of the motions, etc., as described in further detail hereinabove.

In one example, the system includes two pairs of stereo cameras 21 in use for capturing the video streams of the player 24 and ball 25. The video streams are fed to the computer 23 and used for tracking the motions of the player 24 and ball 25, say by the 3D motion tracker 12, as described in further detail hereinabove.

In the example, the system further includes two PTZ cameras 28 deployed at opposite positions, i.e. at opposite sides of the court, so as to cover the constrained environment of the court from both sides.

Optionally, the system further includes a lights source 29 (say a laser projector) controlled by the computer 23, say by the pointer of system 100, for pointing a position to the player 24, say using an image of a virtual opponent, as described in further detail hereinabove.

Figure 3:
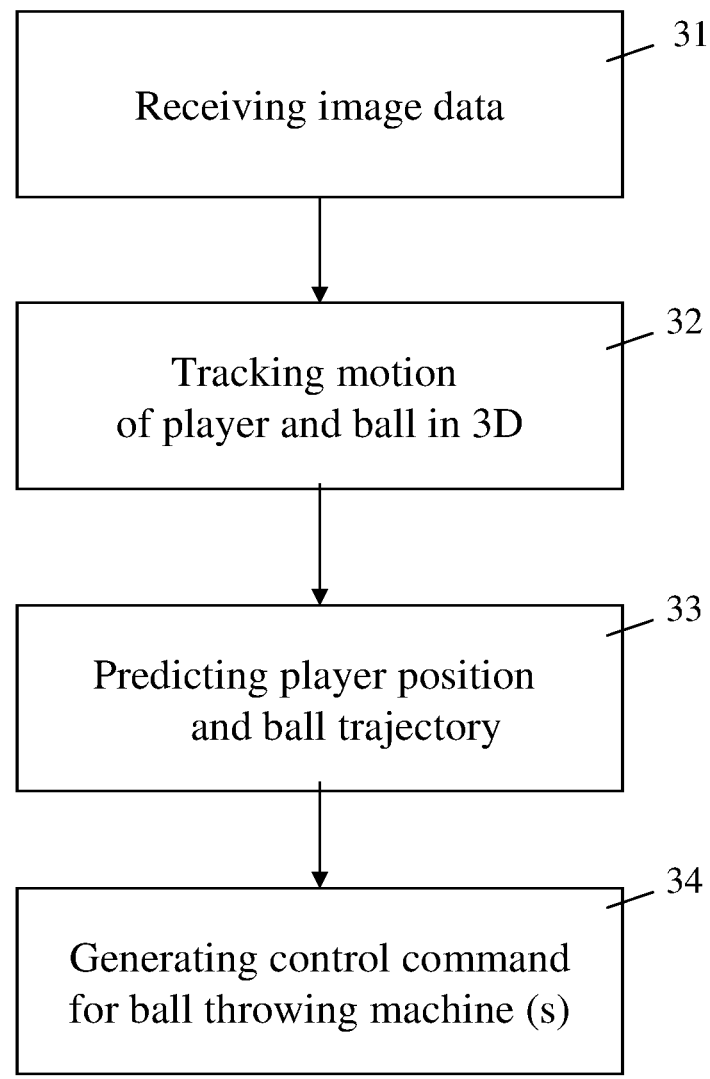
FIG. 3 is a simplified flowchart illustrating a first method for ball game training, according to an exemplary embodiment of the present invention.

Reference is now made to FIG. 3, which is a simplified flowchart illustrating a first method for ball game training, according to an exemplary embodiment of the present invention.

A first exemplary method for ball game training, according to an exemplary embodiment of the present invention, may be executed by a computer. The computer may include a single computer, a group of computers in communication over a network, one or more electric circuits, or any combination thereof.

In one example, for carrying out the first exemplary method, the computer communicates with the two or more cameras, and the one or more ball throwing machines of system 100, say through an intranet network, a local area network, another network, or any combination thereof, as described in further detail hereinabove.

In the method, there is received 31 image data of the player and ball, as captured by the cameras, in real (or near real) time—say video streams captured live by the cameras during a training session, and fed to the video image receiver 11, in real time or in near real time, as described in further detail hereinabove.

Then, there are tracked 32, motion (i.e. a change in spatial location) of the player and motion of the ball, in three dimensions (3D), using the received 31 image data, say by the three dimensional (3D) motion tracker 12, as described in further detail hereinabove.

Optionally, there are further tracked 32 the motions of the one or more ball throwing machines, using the received 31 image data, say in a same way as used for tracking 32 the motions of the player and ball.

Optionally, the tracking 32 of the machines' motions is, additionally or alternatively, based on location information generated by GPS (Global Positioning System) receivers or Differential GPS receivers, installed on the ball throwing machines, and is communicated (say wirelessly) to the computer, as known in the art.

Optionally, for tracking 32 the motion of the player and the motion of the ball in three dimensions, there is generated a three dimensional (3D) space model of a constrained environment in which the training of the player takes place, say a three dimensional space of a tennis court in use by the player.

In one example, the 3D space model is generated through stereoscopic analysis of video streams received 31 simultaneously from the two or more cameras, or through any other, known in the art 3D modeling technique.

In the example, the two (or more) cameras continuously capture images of the constrained environment (i.e. of the court, player, ball, and surroundings) in image data—say as video streams, and feed the image data to the computer on which the first method is implemented, say to the video image receiver 11.

Based on the continuous feed of the video streams, the 3D space model may be continuously updated, and the thus dynamically updated 3D space model, is used to track 32 the motions of the player and ball.

Thus, in one example, there are tracked 32 a round or oval image of the ball and a round or oval image of player' head in the 3D space model based on the image data received 31 simultaneously from the two or more cameras. Consequently, during each session of the player's training, each round or oval image's location is kept track 32 of. Typically, the round or oval image of the ball differs from the round or oval image of the player, in size or shape.

In one example, the motions are tracked 32 from images of the tennis player, captured as the player runs on a tennis court towards a ball thrown by one of the ball throwing machines, and hits the ball with a tennis racket—as captured in the received 31 image data.

Thus, for example, when the player runs to hit a ball thrown by the ball throwing machine, the tracked 32 motions may cover the motion of the player before, during, and after the player's hitting of the ball, as well as the motion of the before and after being hit, as described in further detail hereinbelow.

Next, there are predicted 33 a position of the player and a trajectory of the ball based on the tracked 32 motions, say by the position predictor 13, as described in further detail hereinabove.

Optionally, the position of the player and the trajectory of the ball are predicted 33 based on one or more parameters. The parameters may include, but are not limited to: velocity and direction of the ball and of the player, spin of the ball, sport (say tennis) rules, automatic identification of certain events based on sport rules, wind conditions, historic data gathered on the player, etc., or any combination thereof, as described in further detail hereinabove.

For example, based on the tracked 32 motions of the player and ball, there may be predicted 33 a tennis player's position two seconds after the tennis player hits the ball, and the ball's trajectory over a tennis court's half opposite the player (i.e. the tennis court part which would be used by a real opponent), after the ball is hit by the player.

For predicting 33 the player's position, there may also be taken into consideration historic data gathered on the tennis player, say statistical data gathered through previous training sessions of the player. In one example, the statistical data indicates the player's preferences over different areas of the tennis court—say a preference for areas near one of the court's corners.

Next, there is generated 34 a control command for one or more ball throwing machines, based on the predicted 33 player's position and ball's trajectory, say by the control command generator 14, as described in further detail hereinabove.

The control command instructs the ball throwing machine, to throw the ball in a way (say with initial velocity, direction, and spin), time, etc., which depend on the predicted 33 position and trajectory, as described in further detail hereinabove.

In a first example, the way for throwing the ball is calculated (say by the control command generator 14) such that the ball's trajectory expected when the ball is thrown that way, extends from the ball throwing machine into an area near the net, just opposite the predicted 33 position of the player. Then, the calculated way (say the initial velocity and direction to be given to the ball when being thrown) is specified in the generated 34 control command.

Optionally, the location of the ball throwing machine is also taken into consideration, for calculating the way for throwing the ball, say using location data received from the 3D motion tracker 12 based on a tracking 32 of the ball throwing machine's location, as described in further detail hereinabove.

Optionally, in the method, the player (or another user—say the player's coach) is allowed to select a virtual opponent (say a famous tennis player or simply, another player previously trained, say using the system 100 of FIG. 1).

Consequently, the generated 34 control command instructs the ball throwing machine to throw the ball in a way in which the selected opponent (say the famous player) is likely to hit a ball having the predicted trajectory, towards a player who stands at the predicted position, in light of historic data gathered on the opponent.

Thus, in one example, the velocity, direction, or spin of ball is calculated based on past performance by the famous player when hitting a ball with a parabolic trajectory similar to the ball's predicted trajectory, say a trajectory which extends into a distance of not more than one meter away from the net.

For example, when Bjorn Borg is selected as a virtual opponent, there may be selected a spin which when being applied to the thrown ball, the ball flies in a way which resembles the way Bjorn Borg would hit back a ball served with a trajectory similar to the predicted 33 trajectory, say with Topspin.

Indeed, Topspin is typical of Bjorn Borg's play when hitting back a ball near the net. Topspin is a ball's spin with which the ball rotates forwards as it moves. Topspin on a ball propelled through the air imparts a downward force that causes the ball to drop, due to the ball's interaction with the air.

Optionally, the generation 34 of the control command is further based on one or more drill patterns predefined by a user (say the player's coach, an operator, programmer or administrator of the system 100 of FIG. 1, etc.), as described in further detail hereinabove.

For example, the user may be allowed to customize the system 100, using a GUI (Graphical User Interface) made of one or more menu pages, and thereby to define to the system 100 one or more drill patterns with which a tennis player's net game ay be improved, by forcing the player to hit the ball from areas close to the net.

Consequently, when a user chooses the predefined drill pattern, say using one of the GUI menu pages, the generated 34 control command instructs the ball throwing machine to throw the ball in a way which sends the ball into a trajectory which ends close to the net, on the player's half of the court.

Consequently, at this or a later stage, a user (say a player or coach) is allowed to select a drill patterns amongst the predefined drill patterns. Alternatively, the drill pattern may be preselected automatically, for the user, say by the control command generator 14.

Optionally, after the user selects the drill patterns (or rather after the drill patterns is preselected automatically), each control command is generated 34 based on the same selected drill pattern, until a goal predefined by a user is achieved by the player.

Thus, in one example, there is verified that the player has managed to achieve the predefined goal, say to hit the ball near the net for twenty times in a row, say using motion tracking 32 data generated by the 3D motion tracker 12.

In the example, each time the player hits the ball within a distance of less then one meter away from the net, the motion tracking data indicates that the ball thrown is successfully hit by the player, and the hit is counted as one of those twenty times, as described in further detail hereinabove.

In another example, the player is asked to hit a specific point on the court, by pointing the specific point's location to the player, say using the pointer and light source, as described in further detail hereinabove. Then, there is verified that the player manages to hit the point with the ball, say using motion tracking 32 data generated by the 3D motion tracker 12, as described in further detail hereinabove.

Optionally, each drill pattern is classified into a level (say by the administrator, using the GUI), and the player chooses a level or rather is classified automatically to the level, say by the control command generator 14 based on past performance. For example, a new player may initially be classified into a beginners level, and based on performance—say achievement of the goals, be promoted to a higher level. Consequently, the selection of the drill patterns is at least partially based on the levels of the player and of predefined drill patterns.

Optionally, rule games (say tennis rules) are input by an administrator, operator, user, programmer, etc. as described in further detail hereinabove. Then, based on the tracking 32, there is detected an event predefined in the input rules (say an Out Event). Consequently, based on the detected event, there is updated a score of the player or of the virtual opponent, say according to the tennis rules, as known in the art. Thus, the method may further provide for referee-like and score management functionality, as described in further detail hereinabove.

Optionally, the tracking 32, predicting 33, or both, are further based on pattern analysis and what-if simulation.

Thus, in one example, the predicting 32 may be based on statistical data previously gathered on the player, which statistical data shows that when the ball has a relatively flat trajectory, the player tends to approach the net, or that the player has preferences for certain parts of the court.

Optionally, the method further includes selecting one machine among two (or more) ball throwing machines deployed at different positions (say at different positions on the tennis court), as a destination for the generated 34 control command, say by the ball throwing machine selector, as described in further detail hereinabove.

Consequently, the control command is sent to the selected machine, say by the control command generator 14.

The selection of the ball throwing machine may be based on the predicted 33 player's position and ball's trajectory, on the tracked 32 positions of the ball throwing machines, or on both.

Optionally, the selection of the ball throwing machine is further based on location data generated by the 3D motion tracker 12, as the 3D motion tracker 12 tracks the motions of one or more of the ball throwing machines, as described in further detail hereinabove.

Optionally, the selection of the ball throwing machine is additionally or alternatively, based on historic data gathered on the famous player.

In one example, there is further used historic statistical data previously input to the system 100 (say into a dedicated computer database implemented on the computer), say by an administrator of the system 100. In the example, the historic statistical data indicates that the famous player has a preference for tennis net play, or rather that the famous player has a tendency to hit back a ball from specific areas of the court, as described in further detail hereinabove.

Optionally, the ball throwing machine is movable around the court—say on a rail on which the machine is movably mounted or simply on wheels, using an engine of the machine. Consequently, the method may further include a generation 34 of a control command for the machine to move over, to a selected destined position.

Optionally, the destined position is selected by the control command generator 14 based on the predicted 33 position and trajectory, on the historic data gathered on the famous player (say on the famous player's favorite ball serving positions—thus simulating the famous player's play style), etc., as described in further detail hereinabove.

Optionally, the ball throwing machine further has a mechanical arm, movable by an engine installed on the machine, for hitting a ball (say a mechanical arm shaped like or connected to a tennis racket). Consequently, the method may further include a generation 34 of a control command for the machine to hit the ball having the predicted trajectory, with the mechanical arm, as described in further detail hereinabove.

Optionally, the method further includes a step of calibration, say by the calibrator, as described in further detail hereinabove.

The calibration may include, for example, identifying location of a predefined object present in an area used for the training—say of one or more white border lines of a tennis court, in the received 31 image data.

Optionally, for carrying out the calibration, the court, as captured by the cameras in the image data, is divided into a grid representative of the court's layout, and each junction in the grid is checked for a deviation from the grid.

In one example, the calibrator may use a tennis court's white boundary line's part, as captured in the image data, for estimating all boundary lines of the court, divide the court, as captured in the image data, with a grid representative of the boundary lines of the whole court, and detect areas that are clearly out of those boundaries.

Consequently, there may be automatically issued control commands to a controller (say a dedicated computer) connected to the cameras, to re-align the cameras' direction, tilt angle, etc., say by the calibrator and based on the identified location of the object and detected deviation, as described in further detail hereinabove. Preferably, the deviation from the grid is detected in real (or near real) time, and the control commands are issued promptly after the detection, thus improving the quality of the received 31 image data, during the training session.

Optionally, based the detection of the areas that are clearly out of those boundaries, there may be updated the three dimensional (3D) space model of the constrained environment in which the training of the player takes place, say by the 3D motion tracker 12. For example, based on the detection, there may be removed from the 3D model, the parts which are outside the court and are thus not relevant for tracking 32 the motions of the player and ball. Additionally or alternatively, there may be changed an orientation of the 3D space model, as described in further detail hereinbelow.

Thus, based on the identified location of the predefined object (say a borderline of the tennis court) in the image data, there may be improved the tracking 32 of the motions, the capturing of the image data by the cameras, or both the tracking 32 and the capturing.

Optionally, the method further includes a step of pointing a position to the player, say by the pointer, and using one or more light sources (say a laser beam projector) or rather using a computing device wearable by the player (say an eyewear or a smart helmet), as described in further detail hereinabove.

In one example, there are used one or more light sources. In the example, each one of the light sources is installed on a respective position of the court, is connected to the computer on which the method is implemented, and is controlled directly from the computer.

In another example, each one of the light sources is installed on a respective one of the ball throwing machines, and control commands generated 34 on the computer are sent to the ball throwing machine, for pointing the simulated position, using the light source.

Optionally, using the light sources, there is projected an image of the virtual opponent—say a real (i.e. three dimensional) hologram of the famous player, or a two dimensional image of the famous player—to the player, as the player trains on the court, say for pointing a simulated position of the virtual opponent to the player.

Optionally, the projection of the image involves one of currently used techniques for projecting real (i.e. three dimensional) holograms or two dimensional images.

In one example, the projection is carried out using an array made of one or more laser beam sources (say helium-neon lasers), lenses, mirrors, prisms, beam splitters, etc., or any combination thereof, as known in the art. The array's elements may be installed at different positions of the constrained environment, on the ball throwing machines, etc., or any combination thereof.

Thus, in one example, when the player hits the ball with a trajectory predicted 33 to extend towards a point close to a specific one of several ball throwing machines deployed on the court, there is projected in image of the virtual opponent (say of Novak Djokovic) standing next to the specific ball throwing machine.

Similarly, in another example, there is predicted 33 a certain position of the player when the player waits to be served a ball, say by the position predictor 13. Consequently, the image of the virtual opponent serving a ball is projected in front of a ball throwing machine selected based on the predicted position, and instructed to throw a ball (say by the generated 34 control command), for a few seconds before the ball throwing machine actually throws the ball.

Optionally, a user (say coach) is allowed to remotely control the pointer, for pointing a simulated movement of a virtual opponent to the player, say by projecting and moving an image of the virtual opponent around the court, thus allowing the user to manually intervene in a training session of the player. For example, by moving the image around the court, the user may encourage the player to exercise certain play styles, say a net play, etc.

Optionally, the control commands are generated 34 based on the position pointed by the user, say by moving the image to a specific position. For example, the control command generator 14 may generate a control command which instructs one of the ball throwing machines, to throw a ball in a direction, spin, and velocity, which are likely to send the ball into a trajectory which passes exactly over the position pointed by the user.

Optionally, the generation 34 of the control command is further based on motion of another player preselected as an opponent to the player and of a ball used by the other player, as tracked in a location remote from the ball throwing machine, during the training.

For example, a second system similar to the first system 100, which includes components similar to the component 11-14 of the first system, may be installed at a remote tennis court in use by the other tennis player.

In the example, the second system communicates tracking data generated by the second system's component similar to the 3D motion tracker 12 of the first system 100, from tracking the motion of the other player and the ball in use by the other player, to the control command generator 14 of the first system, in real time or near real time.

Consequently, the generation 34 of the control command may be further based on the tracking data communicated by the second system in real time or near real time.

Optionally, the generation 34 of the control command is further based on motion of an avatar in a video game or a video game like GUI, as used by a user of the video game or GUI, during the training, as described in further detail hereinbelow.

For example, a tennis computer game may be played by a user remote from the computer of the present method, on a web server, say using an internet web browser installed on the remote user's computer (say a tablet computer or a cellular phone), as described in further detail hereinabove.

The computer game of the example may be implemented using a dedicated computer program, which runs on a web server and allows the user to control an avatar of a tennis player who plays against a second avatar, in the computer game.

In the example, the motion of the avatar, controlled by the user during the game, is tracked by the computer program, and communicated to the computer (say to the control command generator 14 the system 100) in real time, say in a data file, as described in further detail hereinabove.

Consequently, the generation 34 of the control command may be further based on the tracking data communicated by the computer program in the data file.

Thus, in one example, the player's coach may use the computer game, to remotely intervene in the training session, and guide the player through the training session, say from the coach's home.

Optionally, in the method, there is further generated video game content based on the tracking 32, predicting 33, or both tracking 32 and predicting 33, say by the video game content generator, as described in further detail hereinabove.

In a first example, the video game content is generated by the position predictor 13 and the computer program which implements the computer game, as described in further detail hereinabove.

In the first example, the position predictor 13 communicates the predicted 33 player's position and ball's trajectory to the program which implements the computer game. The computer program in turn, moves the second avatar in a motion based at least partially, on the predicted 33 player's position and ball's trajectory.

In a second example, during the training session, the player's motion and ball's motion are tracked 32, say by the 3D motion tracker 12. The tracked 32 motions and positions from which the ball is thrown at the player, per the generated 34 control commands, are recorded in a database, say by the 3D motion tracker 12. Consequently, after the training session, the program which implements the computer game, generates game content which graphically presents the tracked 32 motions, in the computer game, using the database.

Optionally, the generation 34 of the control command is further based on voice commands given by the player, picked by microphones, and recognized using a voice recognition component implemented on the computer, as described in further detail hereinabove. The voice commands may include, but are not limited to commands such as: "Start session", "Stop session", "Start drill number seven", "Start drill pattern of beginners level", etc., or any combination thereof.

Optionally, the method further includes using tracking 32 data pertaining to the ball, for identifying if after being hit by the player, the ball hits a predefined position, say a position pointed to the player by the player's coach, using a light source, as described in further detail hereinabove.

Optionally, the method further includes controlling one or more PTZ cameras based on the tracked 32 motions of the player and ball, on the predicted 33 player's position and ball's trajectory, or on both, say by camera controller, as described in further detail hereinabove. The controlling may be carried out by generating 34 control commands for pitching, yawing, zooming (say for better analysis of the tracked 32 motions, after a training session), etc., as described in further detail hereinbelow.

Optionally, the controlling of the one or more PTZ cameras, based on the tracked 32 motions, is carried out using VMD (Video Motion Detection) Methods and Devices, which are applied, for example, for following the player with the PTZ camera, as known in the art.

Optionally, the tracked 32 motions are logged during a training session in a database, say by the logger, as described in further detail hereinabove. Consequently, the logged motions may be used for presenting tracked 32 motions of the player and ball on a computer screen, thus allowing the user to analyze the player's performance, say by the briefing module, as described in further detail hereinabove.

Optionally, there are further logged or recorded on a database, the received 31 image data (or parts thereof), voice commands given by the player and picked by microphones, geographical information gathered based on the tracking 32, on GPS (or Differential GPS) device reading, or on user input, etc.,—say by the logger, as described in further detail hereinabove.

Optionally, in the method, there are further generated workout statistics, video and/or audio recordings, speed analysis of the tracked 32 motions of the player and ball, mileage analysis of the player's tracked 32 motion, a counting of predefined events (say a tennis out, net, or ace event, a football touchdown event), etc).

Optionally, the method further includes one or more steps of bio-mechanical analysis, technical analysis, tactical analysis, another form of analysis, or any combination thereof, on the motions of the player and ball, through known in art analysis techniques.

Figure 4:
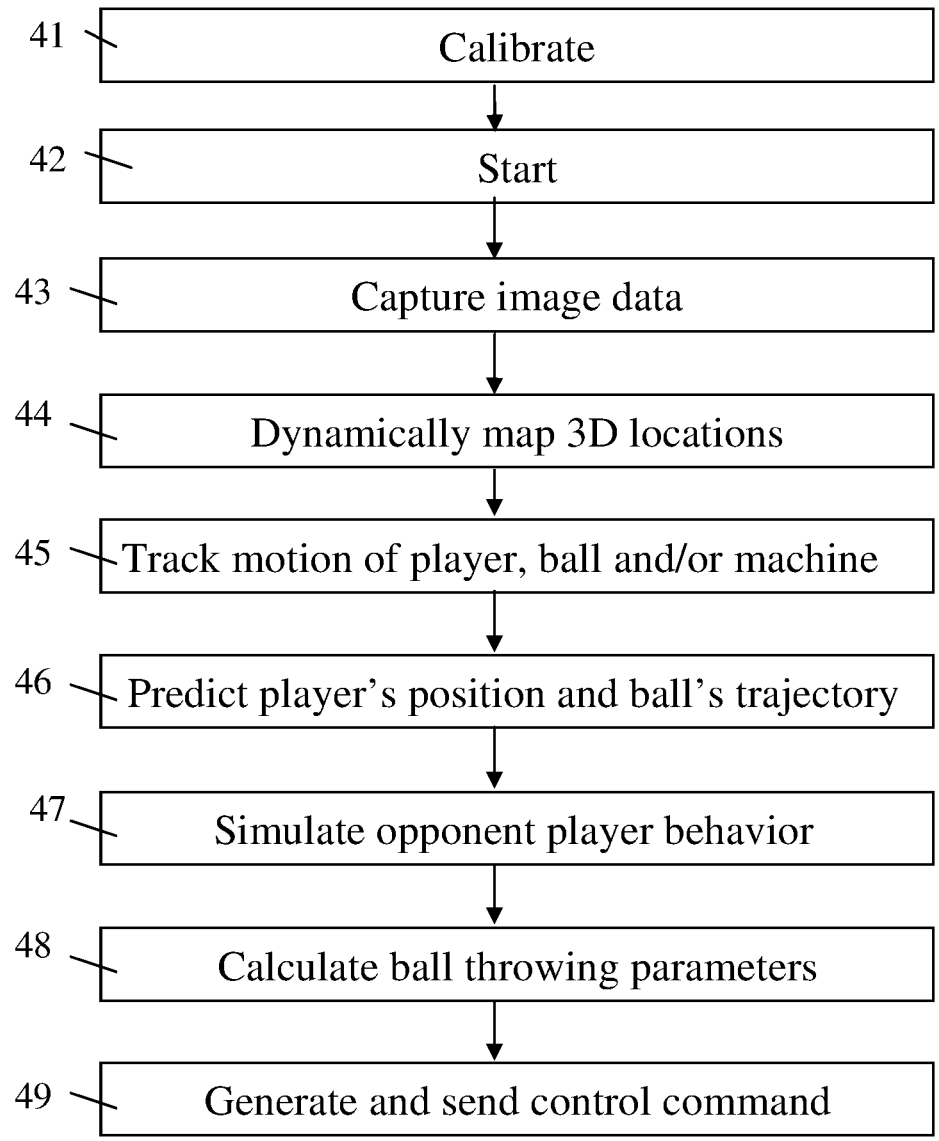
FIG. 4 is a simplified flowchart illustrating a second method for ball game training, according to an exemplary embodiment of the present invention.

Reference is now made to FIG. 4, which is a simplified flowchart illustrating a second method for ball game training, according to an exemplary embodiment of the present invention.

A second exemplary method, according to an exemplary embodiment of the present invention, is executed by a computer in communication with two or more cameras and one or more ball throwing machine, deployed in a constrained environment (say of a tennis court), as described in further detail hereinabove.

In an initial phase of the second exemplary method, the cameras are calibrated 41 by the computer, say by identifying the court's white boundary lines or a part thereof, using image data captured by the cameras), as described in further detail hereinabove.

Later, when a training session of a player starts, the cameras are turned on, say by an operator or automatically (say using VMD methods) and start 42 capturing image data (say video streams) of the constrained environment (say the court and the court's surrounding).

During the training session, the cameras continuously capture 43 image data of the constrained environment, in which image data, the camera also capture motions of the player, the ball, and optionally, of the ball machine too, and the captured 43 image data is transmitted to the computer.

On the computer, the captured 43 image data is used to dynamically map 44 locations of the player, ball, and/or machine in three dimensions, as described in further detail hereinabove.

Optionally, for dynamically mapping 44 the locations in three dimensions, there is generated a three dimensional (3D) space model of the constrained environment in which the training of the player takes place. The 3D space model maps the constrained environment of a tennis court in use by the player, in three geographic coordinates, as described in further detail hereinabove.

In one example, the 3D space model is generated through stereoscopic analysis of video streams captured 43 simultaneously by the cameras, as known in the art. With the stereoscopic analysis of the video streams, pixel values in images captured 43 simultaneously, may be translated 44 into 3D coordinate data on location of the player, the ball, and optionally, the ball throwing machine too.

Based on the dynamically mapped 44 locations, there are tracked 45 the motions of the ball, player, and optionally, the ball throwing machine too.

Based on the tracked 45 motion of the player, the computer calculates the player's motion's direction and speed, and predicts 46 the player's expected position in a few seconds time, say at the end of the next play act. The prediction 46 may be based on parameters which may include, but are not limited to: the player's calculated direction and speed, previous information on player (say a preference for positions near the net), etc., as described in further detail hereinabove.

Based on the tracked 45 motion of the ball, the computer calculates the ball's direction and speed, and predicts 46 the ball's trajectory (potentially including the ball's expected touch point with the ground).

Next, the computer simulates 47 a behavior of a virtual opponent, which behavior is responsive to the predictions 46. The simulated behavior may include, for example, an expected position which the virtual opponent is likely to run into, in an attempt to hit back the ball, an expected direction, velocity and spin of the ball, resultant upon being hit back, etc., as described in further detail hereinabove.

The simulated behavior of the virtual opponent player may depend on a variety of parameters. The parameters may include, but are not limited to: training programs made of predefined drill patterns, history data gathered on the player who trains on the court (say the player's official tennis ranking), history data gathered on the virtual player. etc., as described in further detail hereinabove.

Next, the computer uses the simulated behavior, for calculating 48 the ball throwing parameters.

The ball throwing parameters may include, but are not limited to: which machine among two or more ball throwing machines deployed at different positions, to use for the throwing, a direction, velocity and spin for the machine to throwing a ball with, etc., as described in further detail hereinabove.

Then, based on the calculated 48 ball throwing parameters, the computer generates 49 a control command based on the calculating 48 parameters, and sends the generated 49 control command to the ball throwing machine, as described in further detail hereinabove.

Figure 5:
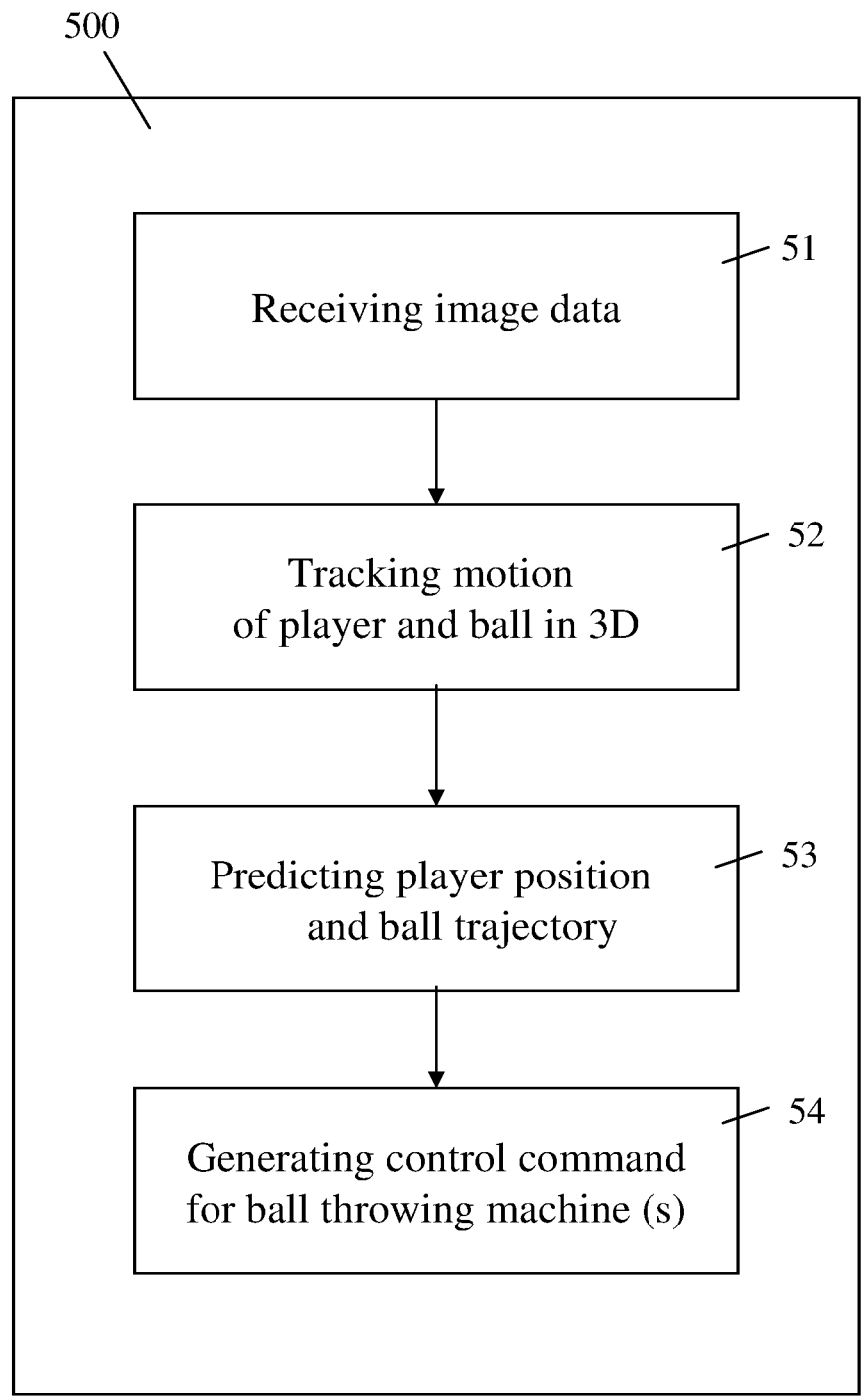
FIG. 5 is a block diagram schematically illustrating an exemplary computer readable medium storing computer executable instructions for performing steps of ball game training, according to an exemplary embodiment of the present invention.

Reference is now made to FIG. 5, which is a block diagram schematically illustrating an exemplary computer readable medium storing computer executable instructions for performing steps of ball game training, according to an exemplary embodiment of the present invention.

According to an exemplary embodiment of the present invention, there is provided a non-transitory computer readable medium 500, such as a CD-ROM, a USB-Memory, a Hard Disk Drive (HDD), a Solid State Drive (SSD), etc.

The computer readable medium 500 stores computer executable instructions, for performing steps of ball game training. The instructions may be executed upon one or more computers.

In one example, for execution of the instructions by a computer, the computer communicates with two or more cameras, and one or more ball throwing machines, say through an intranet network, a local area network, another network, or any combination thereof, as described in further detail hereinabove.

The computer executable instructions include a step of receiving 51 image data of the player and ball, in real time or in near real time. The image data (say video streams) is captured live by the cameras, in real time or in near real time, during a training session, as described in further detail hereinabove.

The computer executable instructions further include a step of tracking 52 motion of the player and motion of the ball, in three dimensions (3D), using the received 51 image data, as described in further detail hereinabove.

Optionally, there are further tracked 52 motions of one or more of the ball throwing machines, using the received 51 image data, say in a same way as used for tracking 52 the motions of the player and ball, as described in further detail hereinbelow.

Optionally, the tracking 52 of the machines' motions is, additionally or alternatively, based on location information generated by GPS (Global Positioning System) receivers or Differential GPS receivers, installed on the ball throwing machines, and communicated (say wirelessly) to the computer which executes the instructions, as known in the art.

Optionally, for tracking 52 the player's motion of and the ball's motion, in three dimensions, there is generated a three dimensional (3D) space model of a constrained environment in which the training of the player takes place, say of the constrained environment of a tennis court in use by the player during the training session.

In one example, the 3D space model is generated through stereoscopic analysis of video streams received 51 simultaneously from the two or more cameras, or through any other, known in the art 3D modeling technique.

In the example, the two (or more) cameras continuously capture images of the constrained environment (i.e. of the court, player, ball, and surroundings) in image data—say as video streams, and feed 51 the image data to the computer which executes the instructions.

Based on the continuous feed 51 of the video streams, the 3D space model is updated, and the thus dynamically updated 3D space model, is used to track 52 the motions of the player and ball.

Thus, in one example, there are tracked 52 a round or oval image of the ball and a round or oval image of player' head in the 3D space model based on the image data received 51 simultaneously from the two or more cameras. During each session of training the player, each round or oval image's location is kept track 52 of. Typically, the round or oval image of the ball differs from the round or oval image of the player, in size or shape.

In one example, the motions are tracked 52 from images of the tennis player, captured as the player runs on a tennis court towards a ball thrown by one of the ball throwing machines, and hits the ball with a tennis racket—as captured in the received 51 image data.

Thus, for example, when the player runs to hit a ball thrown by the ball throwing machine, the tracked 52 motions may cover the motion of the player before, during, and after the player's hitting of the ball, as well as the ball's motion before and after being hit, as described in further detail hereinabove.

The computer executable instructions further include a step of predicting 53 a position of the player and a trajectory of the ball based on the tracked 52 motions, as described in further detail hereinabove.

Optionally, the position of the player and the trajectory of the ball are predicted 53 based on one or more parameters. The parameters may include, but are not limited to: velocity and direction of the ball and of the player, the ball's spin, sport (say tennis) rules, automatic identification of certain events based on sport rules, wind conditions, historic data gathered on the player, etc., or any combination thereof.

For example, based on the tracked 52 motions of the player and ball, there may be predicted 53 a tennis player's position two seconds after the player hits the ball, and the ball's trajectory over a tennis court's half opposite the player (i.e. the court's part which would be used by a real opponent), after the player hits the ball.

For predicting 53 the player's position, there may also be taken into consideration historic data gathered on the tennis player, say statistical data gathered through previous training sessions of the player. In one example, the statistical data indicates the player's preferences over different areas of the tennis court, say a preference for areas near the court's corners, as described in further detail hereinabove.

The computer executable instructions further include a step of generating 54 a control command for one or more ball throwing machines, based on the predicted 53 player's position and ball's trajectory, as described in further detail hereinabove.

The control command instructs the ball throwing machine, to throw the ball in a way (say with initial velocity, direction, and spin), time, etc., which depend on the predicted 53 position and trajectory, as described in further detail hereinabove.

In a first example, the way for throwing the ball is calculated, such that the ball's trajectory expected when the ball is thrown that way, extends from the ball throwing machine into an area near the net, just opposite the predicted 53 position of the player. Then, the calculated way (say the initial velocity and direction to be given to the ball when being thrown) is specified in the generated 54 control command.

Optionally, the location of the ball throwing machine is also taken into consideration, for calculating the way for throwing the ball, say using location data based on a tracking 52 of the ball throwing machine's location, as described in further detail hereinabove.

Optionally, the computer executable instructions further include steps of the allowing the player (or another user—say the player's coach) to select a virtual opponent (say a famous tennis player or simply, another player), as described in further detail hereinabove.

Consequently, the generated 54 control command may instruct the machine to throw the ball in a way in which the virtual opponent is likely to hit a ball having the predicted 53 trajectory, when facing an opponent having the position predicted 53 for the player on the court.

Optionally, the way for throwing the ball is calculated based on historic data previously gathered on the virtual opponent (say the famous player), as described in further detail hereinabove.

Thus, in one example, the velocity, direction, or spin of ball is calculated based on past performance by the famous player when hitting a ball with a parabolic trajectory similar to the ball's predicted 53 trajectory (say a trajectory which extends into a distance of not more than one meter away from the net).

For example, when Bjorn Borg is selected as a virtual opponent, there may be calculated a spin which when being applied to the thrown ball, the ball flies in a way which resembles the way Bjorn Borg would hit back a ball served with a trajectory similar to the predicted 53 trajectory, say with Topspin.

Indeed, Topspin is typical of Bjorn Borg's play when hitting back a ball near the net. Topspin is a ball's spin with which the ball rotates forwards as it moves. Topspin on a ball propelled through the air imparts a downward force that causes the ball to drop, due to the ball's interaction with the air.

Optionally, the control command is generated 54 further based on one more drill patterns predefined by a user (say the player's coach, an operator, programmer or administrator of the computer, etc.), as described in further detail hereinabove.

For example, the computer executable instructions may further include a step of allowing the user to use a GUI (Graphical User Interface) made of one or more menu pages, for defining one or more drills patterns in which a tennis player's net game is improved, by forcing the player to hit the ball from areas close to the net.

The computer executable instructions may further include a step of allowing a user (say a player or coach) to choose a drill pattern amongst the predefined drill patterns. Alternatively, the computer executable instructions may include a step of preselecting the drill pattern amongst the predefined drill patterns, automatically, for the player, say on a random basis.

Consequently, when a user chooses the predefined drill pattern, say using one of the GUI menu pages, the generated 54 control command instructs the ball throwing machine to throw the ball in a way which sends the ball into a trajectory which ends close to the net, on the player's court half, as described in further detail hereinabove.

Optionally, after the user chooses the predefined drill patterns (or rather after the drill pattern is preselected automatically), each control command is generated 54 based on the same selected drill pattern, until a goal predefined by a user is achieved by the player.

Thus, in one example, the computer executable instruction further include a step of verifying that the player has managed to achieve a predefined goal—say one of hitting the ball near the net for twenty times in a row, say using motion tracking 52 data, as described in further detail hereinabove.

Optionally, the tracking 52, predicting 53, or both, are further based on pattern analysis and what-if simulation, as described in further detail hereinabove.

Optionally, the computer executable instructions further include a step of selecting a ball throwing machine among two (or more) ball throwing machines deployed at different positions (say at different positions on the tennis court), as a destination for the generated 54 control command, as described in further detail hereinabove.

Consequently, the computer executable instructions further include a step of sending of the generated 54 control command, to the selected machine, as described in further detail hereinabove.

Optionally, the selection of the ball throwing machine is based on the predicted 53 player's position and ball's trajectory, on the positions of the ball throwing machines, or on both.

Optionally, the selection of the ball throwing machine is further based on location data generated when tracking 52 the motions of one or more of the ball throwing machines, as described in further detail hereinabove.

Optionally, the selection of the ball throwing machine is additionally or alternatively, based on historic data gathered on the famous player.

In one example, for the selection, there is further used historic statistical data previously input, say by an administrator or operator of the computer. In the example, the historic statistical data indicates that the famous player has a preference for tennis net play, or rather that the famous player has a tendency to hit back a ball from specific areas of the court, as described in further detail hereinabove.

Optionally, the ball throwing machine is movable around the court, say on a rail on which the machine is movably mounted or simply on wheels, using an engine of the machine.

Consequently, the computer executable instructions may further include a step of generating 54 a control command for the machine to move over, to a destined position selected based on the predicted 53 position and trajectory, as described in further detail hereinabove.

Optionally, the ball throwing machine further has a mechanical arm, movable by an engine installed on the machine, for hitting a ball (say a mechanical arm shaped like or connected to a tennis racket), Consequently, the computer executable instructions may further include a step of generating 54 a control command for the machine to hit the ball having the predicted 53 trajectory, with the mechanical arm, as described in further detail hereinabove.

Optionally, the computer executable instructions further include a step of calibration, as described in further detail hereinabove.

The calibration may include, for example, identifying location of a predefined object present in an area used for the training—say of one or more border lines of a tennis court, in the received 51 image data.

Optionally, for carrying out the calibration, the court as captured by the cameras in the image data is divided into a grid representative of the court's layout, and each junction in the grid is checked for a deviation from the grid.

For example, the calibration may include using the tennis court's boundary parts, as captured in the received 51 image data, for estimating all boundary lines of the court, dividing the court, as captured in the image data, with a grid representative of the boundary lines of the whole court, and detecting areas out of those boundaries.

Optionally, the calibration further includes automatically issuing control commands to a controller (say a dedicated computer) connected to the cameras, to re-align the cameras' direction, tilt angle, etc., say based on identified location of the object, as described in further detail hereinabove. Preferably, the deviation from the grid is detected in real (or near real) time, and the control commands are issued promptly after the detection, thus improving the quality of the received 51 image data, during a training session of the player.

Optionally, the calibration further includes updating the 3D space model of the constrained environment (say the tennis court), say by removing parts which are outside the court and are thus not relevant for tracking 52, form the 3D model, or by changing the 3D space model's orientation, as described in further detail hereinabove.

Thus, based on the identified location of the predefined object (say a borderline of the tennis court) in the image data, there may be improved the tracking 52 of the motions, the capturing of the image data by the cameras, or both the tracking 52 and the capturing, as described in further detail hereinabove.

Optionally, the computer executable instruction further include a step of pointing a position to the player, say using one or more light sources (say a laser beam projector) or using a computing device wearable by the player (say an eyewear or a smart helmet), as described in further detail hereinabove.

In one example, there are used one or more light sources. In the example, each one of the light sources is installed on a respective position of the court, is connected to the computer, and is controlled directly from the computer, as described in further detail hereinabove.

In another example, each one of the light sources is installed on a respective one of the ball throwing machines, and control commands generated 54 on the computer are sent to the ball throwing machine, for pointing the simulated position, using the light source, as described in further detail hereinabove.

Optionally, the position is pointed to the player, using the light sources (say laser beam light sources), by projecting an image. Optionally, the image is a real (i.e. three dimensional) hologram of the famous player, or rather a two dimensional image of the famous player, in which case the position may be a simulated position of the virtual opponent, thus pointed to the player.

Optionally, the projection of the real hologram involves one of currently used techniques for projecting real (i.e. three dimensional) holograms or two dimensional images.

Thus, in one example, when the player hits the ball with a trajectory predicted 53 to extend towards a point close to a specific one of several ball throwing machines deployed on the court, there is projected in image of the virtual opponent (say of Novak Djokovic) standing next to the specific ball throwing machine.

Similarly, in another example, there is predicted 53 a certain position of the player when the player waits to be served a ball. Consequently, an image of the virtual opponent serving a ball is projected in front of a ball throwing machine instructed to throw a ball by the generated 54 control command, for a few seconds, before the ball throwing machine actually throws the ball.

Optionally, the computer executable instructions further include a step of allowing a user (say the player's coach) to point a simulated position of a virtual opponent to the player, say by projecting and moving an image of the virtual opponent around the court, thus allowing the user to manually intervene in a training session of the player.

Thus, for example, by moving the virtual opponent's (say famous actor) image around the court, the user (say coach) may encourage the player to exercise certain play styles, say a net play, etc.

Optionally, the control commands are generated 54 based on the position pointed by the user (say by moving the projected image to a specific position). Thus in one example, there is generated 54 a control command which instructs a ball throwing machine, to throw a ball in a direction, spin, and velocity, which are likely to send the ball into a trajectory which passes exactly over the position pointed by the user.

Optionally, the generation 54 of the control command is further based on motion of another player preselected as an opponent to the player and a ball used by the other player, as tracked in a location remote from the ball throwing machine, during the training, as described in further detail hereinabove.

Optionally, the generation 34 of the control command is further based on motion of an avatar in a video game, as used by a user of the video game during the training, as described in further detail hereinabove.

For example, a tennis computer game may be played by a user remote from the computer which executes the instructions, on a web server, say using an internet web browser installed on the remote user's computer, as described in further detail hereinabove.

The computer game of the example may be implemented using a dedicated computer program, which runs on a web server and allows the user to control an avatar of a tennis player who plays against a second avatar, in the computer game. The motion of first avatar, controlled by the user during the game, may be tracked by the computer program, and communicated to the computer which executes the instructions, in real time, say in a data file, as described in further detail hereinabove.

Consequently, the generation 54 of the control command may be further based on the tracking data communicated by the computer program in the data file, as described in further detail hereinabove.

Optionally, the computer executable instructions further include a step of generating video game content based on the tracking 52, predicting 53, or both, as described in further detail hereinabove.

In one example, the computer executable instructions further include a step of communicating the predicted 53 player's position and ball's trajectory to the program which implements the computer game on the web server. The computer program in turn, moves the second avatar in a motion based at least partially, on the predicted 53 player's position and ball's trajectory.

Optionally, the computer executable instructions further include a step of receiving voice commands from the player, using microphones, during the training session, and recognizing the voice commands using voice recognition techniques, as known in the art. Consequently, the generation 54 of the control command is further based on the received and recognized voice commands. The commands may include commands such as: "Start session", "stop session", "start drill number seven", "Start drill pattern of beginners level", etc., or any combination thereof.

Optionally, the computer executable instructions further include a step of using tracking 52 data pertaining to the ball, for identifying if after being hit by the player, the ball hits a predefined position, say a position pointed to the player by the player's coach, using a light source, as described in further detail hereinabove.

Optionally, the computer executable instructions further include a step of controlling one or more PTZ cameras based on the motions of the player and ball as tracked 52, on the player's position and ball's trajectory as predicted 53, or on both, as described in further detail hereinabove.

Optionally, the computer executable instructions further include one or more steps of out bio-mechanical analysis, technical analysis, tactical analysis, another form of analysis, or any combination thereof, on the tracked 52 motions of the player and ball, through known in art analysis techniques, as described in further detail hereinabove.

It is expected that during the life of this patent many relevant devices and systems will be developed and the scope of the terms herein, and particularly of the terms "Computer", "CD-ROM", "USB-Memory", "Hard Disk Drive (HDD)", "Solid State Drive (SSD)", "Camera", "PTZ Camera", "Ball throwing machine", "Laser", "Light Source", "Hologram", "Projector", "Network", "Speaker", "Microphone", "Tablet", and "Smart Phone", is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method for ball game training, the method comprising steps executed by at least one computer, the steps comprising:
   receiving image data of a player and a ball, the image data being captured using at least two cameras;
   using the received image data, tracking motion of the player and motion of the ball in three dimensions;
   based on the tracked motions, predicting a position of the player and a trajectory of the ball; and
   based on the predicted position and trajectory, generating a control command for at least one ball throwing machine.

2. The method of claim 1, wherein said generating further comprises specifying a way of ball throwing by the ball throwing machine, in the control command.

3. The method of claim 1, wherein said predicting is further based on historic data gathered on the player.

4. The method of claim 1, wherein said generating is further based on historic data gathered on another player preselected as a virtual opponent.

5. The method of claim 1, wherein said generating is further based on at least one predefined drill pattern.

6. The method of claim 1, wherein each generation of a control command is further based on a same predefined drill pattern, until a predefined goal is achieved by the player.

7. The method of claim 1, wherein the at least one ball throwing machine comprises at least two ball throwing machines deployed at different positions, and the method comprises selecting one of the at least two ball throwing machines as a destination for the generated control command, based on the predicted position of the player and trajectory of the ball and on the positions of the at least two ball throwing machines.

8. The method of claim 1, wherein the control command is a control command for one of the at least one ball throwing machines to move over, to a destined position, based on the predicted position and trajectory.

9. The method of claim 1, wherein the control command is a control command for moving one of the at least one ball throwing machines on a rail, to a destined position, based on the predicted position and trajectory.

10. The method of claim 1, wherein the control command is a control command for one of the at least one ball throwing machines to hit the ball having the predicted trajectory, with a mechanical arm.

11. The method of claim 1, further comprising identifying a location of a predefined object in the received image data, and based on the identified location, altering at least one of said tracking of the motions and capturing of the image data by the cameras.

12. The method of claim 1, further comprising pointing a simulated position of a virtual opponent to the player, using at least one light source.

13. The method of claim 1, further comprising pointing a simulated position of a virtual opponent to the player, by projecting an image of the player.

14. The method of claim 1, further comprising pointing a second position to the player, using at least one light source.

15. The method of claim 1, further comprising pointing a second position to the player, using a display of a wearable computing device.

16. The method of claim 1, further comprising allowing a user to point to a second position, using at least one light source, wherein said generating of the control command is further based on the pointed second position.

17. The method of claim 1, wherein said generating of the control command, is further based on motion of a second player preselected as an opponent to the player, as tracked in a location remote from one of the at least one ball throwing machines.

18. The method of claim 1, wherein said generating of the control command, is further based on motion of an avatar in a video game, as used by a user of the video game.

19. The method of claim 1, further comprising generating video game content based on at least one of said tracking and predicting.

20. The method of claim 1, further comprising identifying if after being hit by the player, the ball hits a predefined position.

21. The method of claim 1, wherein said generating of the control command, is further based on a voice command received from the player.

22. A system for ball game training, the system comprising:
   a computer;
   an image data receiver, implemented on said computer, configured to receive image data of a player and a ball, the image data being captured using at least two cameras;
   a three dimensional motion tracker, in communication with said image data receive, configured to track motion of the player and motion of the ball in three dimensions, using the received image data;
   a position predictor, in communication with said three dimensional motion tracker, configured to predict a position of the player and a trajectory of the ball based on the tracked motions; and
   a control command generator, in communication with said position predictor, configured to generate a control command for at least one ball throwing machine based on the predicted position and trajectory.

23. A non-transitory computer readable medium storing computer executable instructions for performing steps of ball game training, the steps comprising:
   receiving image data of a player and a ball, the image data being captured using at least two cameras;
   using the received image data, tracking motion of the player and motion of the ball in three dimensions;

based on the tracked motions, predicting a position of the player and a trajectory of the ball; and based on the predicted position and trajectory, generating a control command for at least one ball throwing machine.

* * * * *